UNITED STATES PATENT OFFICE.

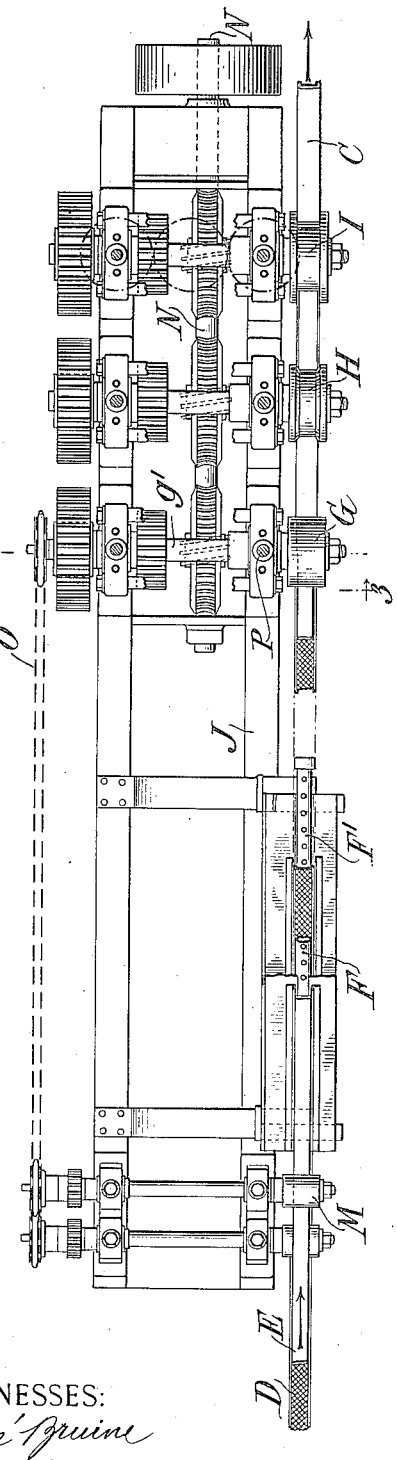
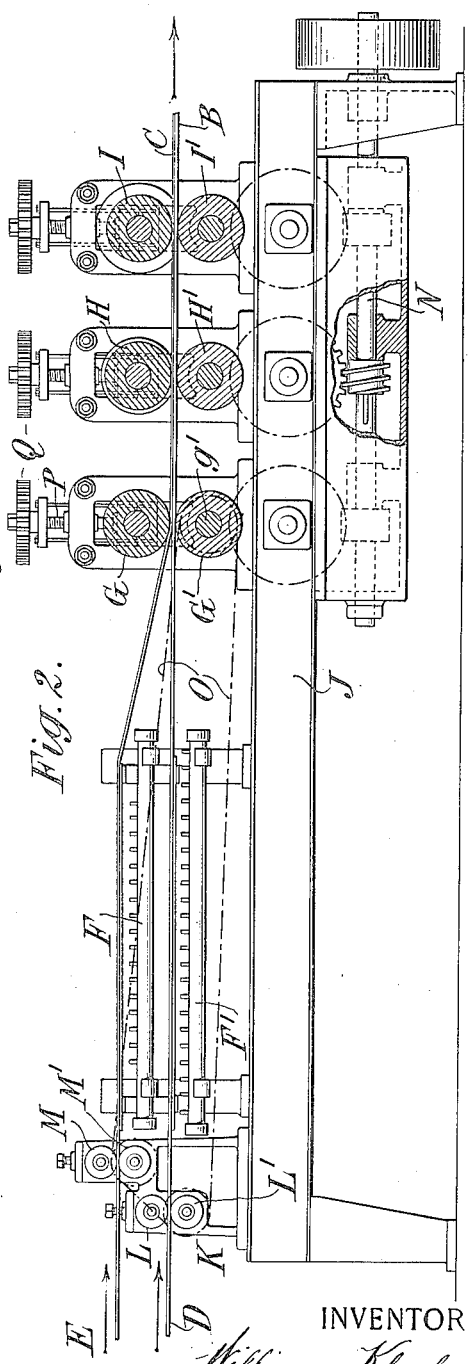

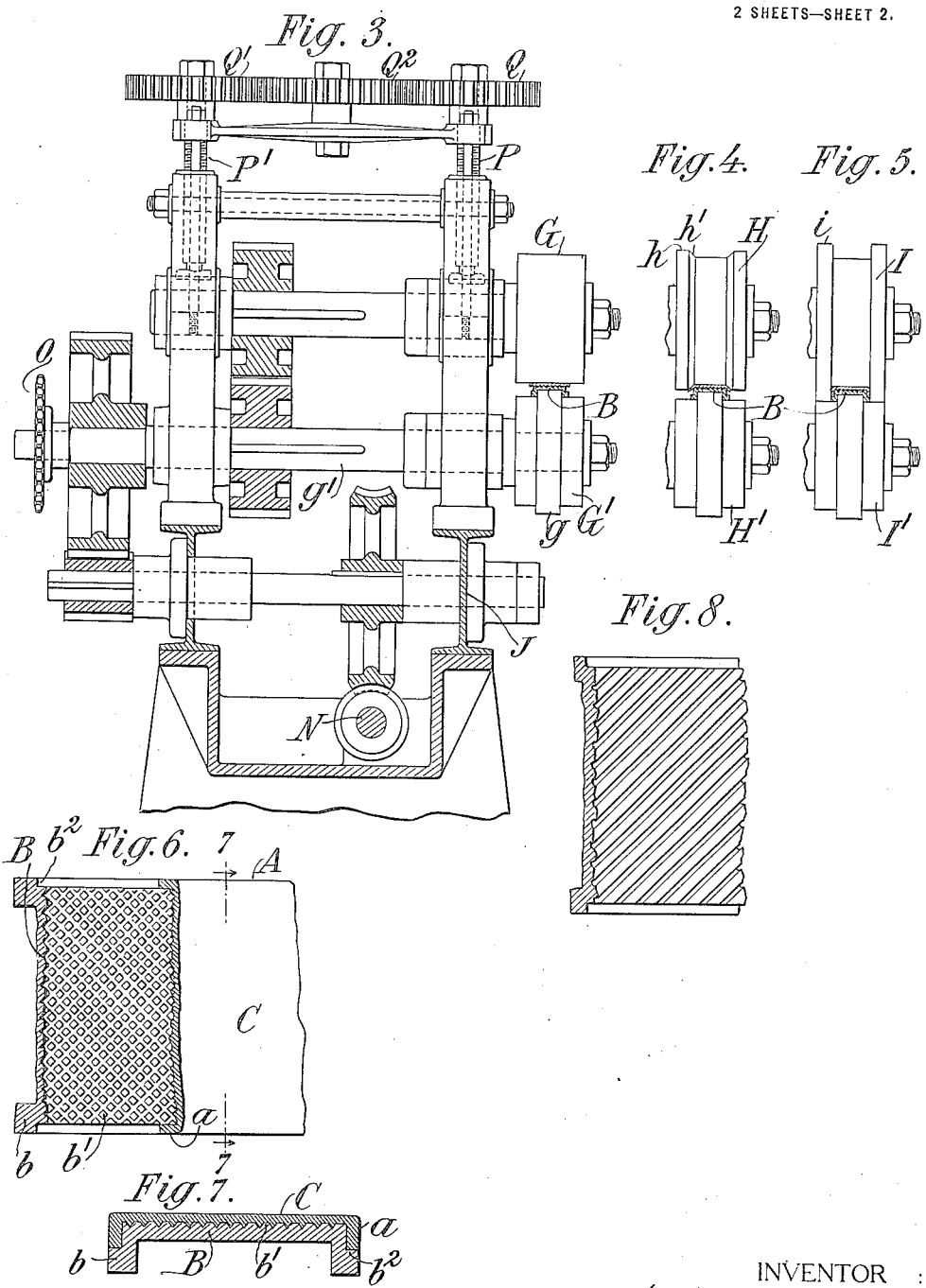

WILLIAM KLOCKE, OF BROOKLYN, NEW YORK, ASSIGNOR TO PRESSED BEARING COMPANY INC., OF BROOKLYN, NEW YORK, A CORPORATION OF NEW YORK.

METHOD FOR MAKING LINED BEARINGS.

1,302,563.                  Specification of Letters Patent.          Patented May 6, 1919.

Application filed May 31, 1916. Serial No. 100,874.

*To all whom it may concern:*

Be it known that I, WILLIAM KLOCKE, a citizen of the United States of America, residing in the borough of Brooklyn, county of Kings, in the city and State of New York, have invented certain new and useful Improvements in Methods for Making Lined Bearings, of which the following is a specification.

My invention relates to a method for making lined bearings. The invention has for its object to provide an improved method for the production of a lined bearing wherein the liner has a secure bond with the body. The character of bearings to which I have illustrated my invention as being applied has a semi-cylindrical shell or body portion which is usually provided with exterior flanges and is lined with suitable bearing metal, such as Babbitt-metal. A complete bearing usually employs two of such semi-cylindrical lined shells and these are extensively used in automobiles.

My present invention is in part an improvement upon the method of making lined bearings set forth in my Patent No. 1,180,728, dated April 25, 1916. In that patent I have set forth at length the methods previously in use in the production of lined half bearings, which I will not here repeat. The present invention accomplishes the advantages set forth in my said patent and other advantages in addition thereto.

The said patent relates to the methods of producing the structure therein illustrated and described and this application is not only an improvement upon the said method, but produces a lined bearing having novel characteristics which forms a part of my invention and also produces a novel apparatus which also forms a part of the present invention. According to my present invention the lined half bearing is formed with a face which is provided with anchorages for the lining metal, as for instance, by knurling the said face and to this face the lining metal is applied and upon the application of pressure the said liner is not only densified, but is forced into the anchorages or depressions upon the said face whereby a secure anchorage for the liner is provided and the same is prevented from moving relatively to the body or shell.

In the method of my present invention, the metal forming the body and the metal forming the liner, one of which is coated with solder, are each fed in sheets or strips adjacent heaters, whereby they are heated and the solder is softened, so that when the heated strips are passed between pressure rolls they are securely soldered together. By these pressure rolls also the lining metal is densified and forced into the anchorages or depressions in the knurled face of the body strip, so that it is securely anchored thereto. The strip of lining metal is preferably wider than the face of the body strip. Longitudinal flanges are formed on the edges of the lined strips producing a flanged and lined blank wherein the liner extends onto the outer faces of the flanges. The machine for practising the invention is provided with feed and guide rolls adjacent the heaters and with pressure rolls between which the lined strip passes and with flange rolls for forming the flanges on the longitudinal edges of the liner.

In the accompanying drawings,—

Figure 1 illustrates my improved machine in plan view, partly broken.

Fig. 2 is a side elevation thereof partly in section.

Fig. 3 is a cross section on the line 3—3, Fig. 1, looking in the direction of the arrows, on an enlarged scale.

Figs. 4 and 5 are detail elevations of the flanging rolls.

Fig. 6 is an inner view of part of a lined blank, part of the liner being broken off.

Fig. 7 is a cross section of Fig. 6 on the line 7—7.

Fig. 8 is a view of a modified form of knurled blank.

According to my present invention a lined half bearing is produced, a desirable form of which is illustrated at A, Fig. 6. Here the body or shell B is flanged at $b$ and this flange is preferably thickened by being upset as set forth in my previous patent. The liner C of babbitt is a single sheet of substantially uniform thickness and having a smooth interior. This is preferably secured to the inner cylindrical surface of the shell B by solder, and for the purpose of forming a secure bond between the two and preventing movement of the liner relative to the shell B, I provide an anchorage for the said liner on the said shell by means of recesses and projections as at $b^1$ on the body, and into the space between the said projections the metal forming the liner is pressed. The surface of the shell which is so treated I term "knurled," and this knurling includes not only the particular surface formation illustrated in Figs. 6 and 7, but would include also the modified form of Fig. 8 and many other configurations of surface with which a skilled mechanic is familiar and which would provide thereon space or anchorage into which the liner could be forced by pressure.

The improved bearing illustrated likewise has the liner bent over the edge of the body or shell as at $a$, Fig. 7 and extending outward on the flange a substantial extent so as to provide a lining for a substantial amount of the flange of the shell. By this means a good bearing surface is provided not only for any shaft or rotary member which may revolve in the half bearing, but also for any shoulder or projection thereon which may be in contact with the end of the bearing. This bearing so illustrated may be produced in a variety of ways. In my former patent I have illustrated a method of producing a bearing by flowing the lining metal on the body portion and therein it is stated that the blanks may be produced separately or in strips. Obviously these several modes are applicable to the production of the bearing of Figs. 6 and 7, although I prefer to make this bearing by the method illustrated and hereinafter described. According to the method which I prefer, the lined bearing A is produced as follows:—A strip or sheet D of metal for forming the body of the bearing, which is usually made of brass, has the surface depressions and protuberances formed thereon in any suitable manner and as mechanism for this purpose is well known, I have not illustrated the same. This strip is then preferably flanged and the flanges thickened by upsetting as stated in my previous patent. The lining metal, for which purpose Babbitt-metal is usually employed, is also preferably applied in a single sheet or strip, as the strip E. This strip may be initially narrower than strip D, as shown in Fig. 1. The inner surface of one of these strips should be cleaned by muriatic acid and tinned as by having hard solder applied thereto in the manner set forth in my previous patent for the purpose of securing the said strips together. Preferably the body strip D will carry the solder. The respective strips are then passed adjacent to heaters F F$^1$ whereby they are respectively heated and are then pressed together preferably by passage between pressure rolls, as for instance, the rolls G G$^1$. Between these rolls, the said strips are securely pressed together, so as to be united by the solder, and this pressure is sufficient to not only densify the liner E, but also to press the same into the interstices or spaces in the knurled surface $b^1$. Also, this pressure may widen the strip C, as shown in Fig. 1. Preferably the lining metal is made wide enough to extend beyond the bearing surface of the shell B and to partly cover the flanges $b$. To enable this to be done, my method contemplates means for continuously bending over the liner and forming flanges thereon which fit into the recesses $b^2$ in the flanges B. Such means may take the form of flanging rolls as illustrated in the accompanying drawings at H H$^1$, I I$^1$ which progressively bend the liner into the grooves $b^2$ in the flanges $b$.

The invention is best practised by a machine whereby the lined bearings are produced in continuous or lengthy strips. This machine as illustrated has a frame J upon the left-hand end of which is a standard K carrying the upper and lower feed and guide rolls L L$^1$ which serve to feed and guide the strip D and corresponding upper and lower feed and guide rolls M M$^1$ which serve the same purpose for the liner E. The heaters F F$^1$ are placed between the feed and guide rolls and the pressure rolls G G$^1$ and are of the usual type, such as gas heaters. The lower roll G$^1$ of the first press rolls has a rib $g$ which enters between the flanges of the strip D. The lower flanging rolls H$^1$ I$^1$ are similarly constructed. The upper roll H of the first flanging rolls is formed with flanges $h$ having inclined edges $h^1$ for bending the lining metal and the upper roll I has straight edge flanges $i$ by which the liner is pressed rectangularly into engagement with the groove $b^2$. A worm shaft N through suitable gears and pinions drives each of the rolls G G$^1$, H H$^1$, I I$^1$, and a sprocket chain O on the shaft $g^1$ imparts motion to the lower feed and guide rolls M$^1$ L$^1$.

Each of the rolls G, H, I is mounted in a slide bearing and such bearings may be raised and lowered, so as to regulate the pressure by adjusting rods P P$^1$, each of which is threaded in a part of the frame; these screws have fixed to their upper ends gear wheels Q Q$^1$, which mesh in a center wheel Q$^2$ by which they are caused to revolve together. The particular manner of constructing and adjusting and operating the several parts of the machine are unimportant as these may be changed by a skilled mechanic and their operation is so evident that a detailed description of every part is unnecessary. The general features of the machine, however, have been fully described and these relate to the means whereby the respective strips are heated and attached together so that the liner is densified and also to the means whereby the liner is caused to extend over the flange.

It will be perceived that while in the foregoing description it is stated that the densifying function is performed by the first rolls G G$^1$, all of the rolls G G$^1$, H H$^1$, I I$^1$ are provided with means whereby their pressure may be regulated, and therefore they are all capable of assisting in the performance of the densifying function.

Obviously the strips D E may have any desired length from a length sufficient to form one blank to a length sufficient to form a large number of blanks, and where such long strips are employed they will, after treatment in the machine, be separated into blanks suitable for the production of individual half bearings, which blanks will then preferably be formed into semi-cylindrical shape by the aid of a die and press as illustrated in my prior patent and preferably in the manner therein described.

By the statement in the foregoing specification and the claims that the surface of the shell or body of the liner is knurled, I do not intend to limit myself to any manner of forming the said surface or to any particular configuration thereof, as it will be obvious that this surface may be formed in any one of a large number of shapes, the important feature being that the face of the body strip shall be formed into protuberances or channels or recesses or formed into other secure anchoring surface or both whereby when the liner is pressed to its position it will be securely anchored to the body portion, as by having a part of its material overlap a part of the material of the body portion. These and other modifications in the method and apparatus may be made in the invention within the limits of the appended claims.

What I claim is:—

1. A process for the production of lined half bearings which consists in knurling a face of a metal blank, applying a sheet of lining metal to said knurled face and subjecting such lined blank to pressure.

2. A process for the production of lined half bearings which consists in knurling a face of a metal blank, applying a sheet of lining metal to said knurled face and pressing the lined blank to semi-cylindrical shape.

3. A process for the production of lined half bearings which consists in knurling a face of a metal blank, applying a sheet of lining metal to said knurled face, subjecting the lined blank to pressure to force the lining metal into the cavities of such knurled face, and pressing the lined blank to semi-cylindrical shape.

4. A process for the production of lined half bearings which consists in feeding a strip of lining metal and a strip of body metal one of which has solder thereon adjacent heaters and pressing the same together between rolls whereby they are soldered together and the liner is densified, cutting the soldered strips into blanks and pressing the blanks to semi-cylindrical shape.

5. A process for the production of lined half bearings which consists in knurling the face of a strip of body metal, feeding the same adjacent a heater, feeding a strip of liner adjacent a heater, one of said strips having solder thereon, pressing said strips together between rolls, whereby they are soldered together and the liner is densified, cutting the soldered strips into blanks and pressing the blanks to semi-cylindrical shape.

6. A process for the production of lined half bearings which consists in feeding a flanged strip of body metal and a strip of lining metal, one of which strips has solder thereon, adjacent heaters and between pressure rolls whereby the strips are soldered together and the liner is densified and between flanging rolls whereby the edges of said lining strip are pressed into contact with the body flanges, cutting the strip into blanks and pressing the blanks to semi-cylindrical shape.

7. A process for the production of lined half bearings which consists in knurling the face of a strip of body metal, feeding said strip and also a strip of lining metal, one of which strips has solder thereon, over heaters and between pressure rolls, whereby they are soldered together and the liner is densified and pressed into the cavities in said knurled face, passing said strip between flanging rolls, cutting the lined strip into blanks and pressing the blanks to semi-cylindrical shape.

8. A process for the production of lined half bearings comprising knurling a face of a harder metal, applying a sheet of softer lining metal to said face, and subjecting such lined blank to pressure to cause the lining metal to engage the knurled face of the harder metal.

9. A process for the production of lined half bearings comprising forming a composite strip by uniting a strip of a lining metal and a harder metal having anchorages or depressions therein for the lining metal, and cutting said composite strip into blanks and pressing such blanks to the form of the half bearings.

10. A process for the production of lined half bearings comprising uniting a strip of foundation metal and a strip of lining metal to form a composite sheet, cutting such sheet into blanks and pressing each such blank into the form of the half bearing.

11. A process for the production of lined half bearings comprising heating a strip of foundation metal and a strip of lining metal, pressing said strips together to form a composite sheet, cutting such sheet into blanks and pressing such blanks into the form of the half bearings.

12. A process for the production of lined half bearings comprising uniting a strip of foundation metal and a strip of lining metal to form a composite sheet, applying portions of said lining metal at the sides of said foundation metal, and pressing said composite sheet into the form of the half bearing.

13. A process for the production of lined half bearings comprising forming a composite sheet of lining metal and of foundation metal, applying said lining metal at the sides of said foundation strip, and pressing said composite sheet into the form of the half bearing.

In witness whereof, I have hereunto signed my name in the presence of two subscribing witnesses.

WILLIAM KLOCKE.

Witnesses:
CHAS. J. ELLSWORTH,
FRED. H. McGAHIE.